United States Patent
Kotak et al.

(10) Patent No.: US 12,007,742 B2
(45) Date of Patent: Jun. 11, 2024

(54) OVERHEAT RESTART BEHAVIOR IN NETWORK DEVICES

(71) Applicant: Arista Networks, Inc., Santa Clara, CA (US)

(72) Inventors: Ketan Rasikbhai Kotak, Milpitas, CA (US); Eudean Michael Sun, Walnut Creek, CA (US); Gil Adrian Torres, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 175 days.

(21) Appl. No.: 17/687,337

(22) Filed: Mar. 4, 2022

(65) Prior Publication Data
US 2023/0280716 A1     Sep. 7, 2023

(51) Int. Cl.
  *G05B 19/406*     (2006.01)
  *G06F 1/3287*     (2019.01)
(52) U.S. Cl.
  CPC ......... *G05B 19/406* (2013.01); *G06F 1/3287* (2013.01); *G05B 2219/49216* (2013.01)

(58) Field of Classification Search
  CPC ........ G05B 19/406; G05B 2219/49216; G06F 1/3287
  See application file for complete search history.

(56) References Cited

U.S. PATENT DOCUMENTS

2020/0151043 A1* 5/2020 Chertov ................ G06F 11/079
2020/0387204 A1* 12/2020 McFarland ............. G06F 1/206

* cited by examiner

*Primary Examiner* — Gary Collins
(74) *Attorney, Agent, or Firm* — Tianyi He

(57) ABSTRACT

A method, device, and computer readable medium for managing overheat behavior in a network device. The method includes determining that a first temperature exceeds a threshold by at least one temperature sensor disposed in a network device. The method includes logging a temperature sensor name of the at least one temperature sensor, the first temperature, and actions taken prior to determining that the first temperature exceeds the threshold. The method further includes disabling network device capabilities and enabling a subset of network device capabilities after powering cycling the network device.

20 Claims, 4 Drawing Sheets

OVERHEAT RESTART BEHAVIOR IN NETWORK DEVICES

BACKGROUND

Information technology (IT) networks may include numerous interconnected computing devices, routers, switches and/or other network elements. Modern network devices may include temperature sensors to monitor the temperatures of the components in the network device. If the temperature of one or more sensors exceeds a corresponding critical threshold, the network device may shut down, requiring manual intervention to remove the external power to the network device in order to power up the network device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1:
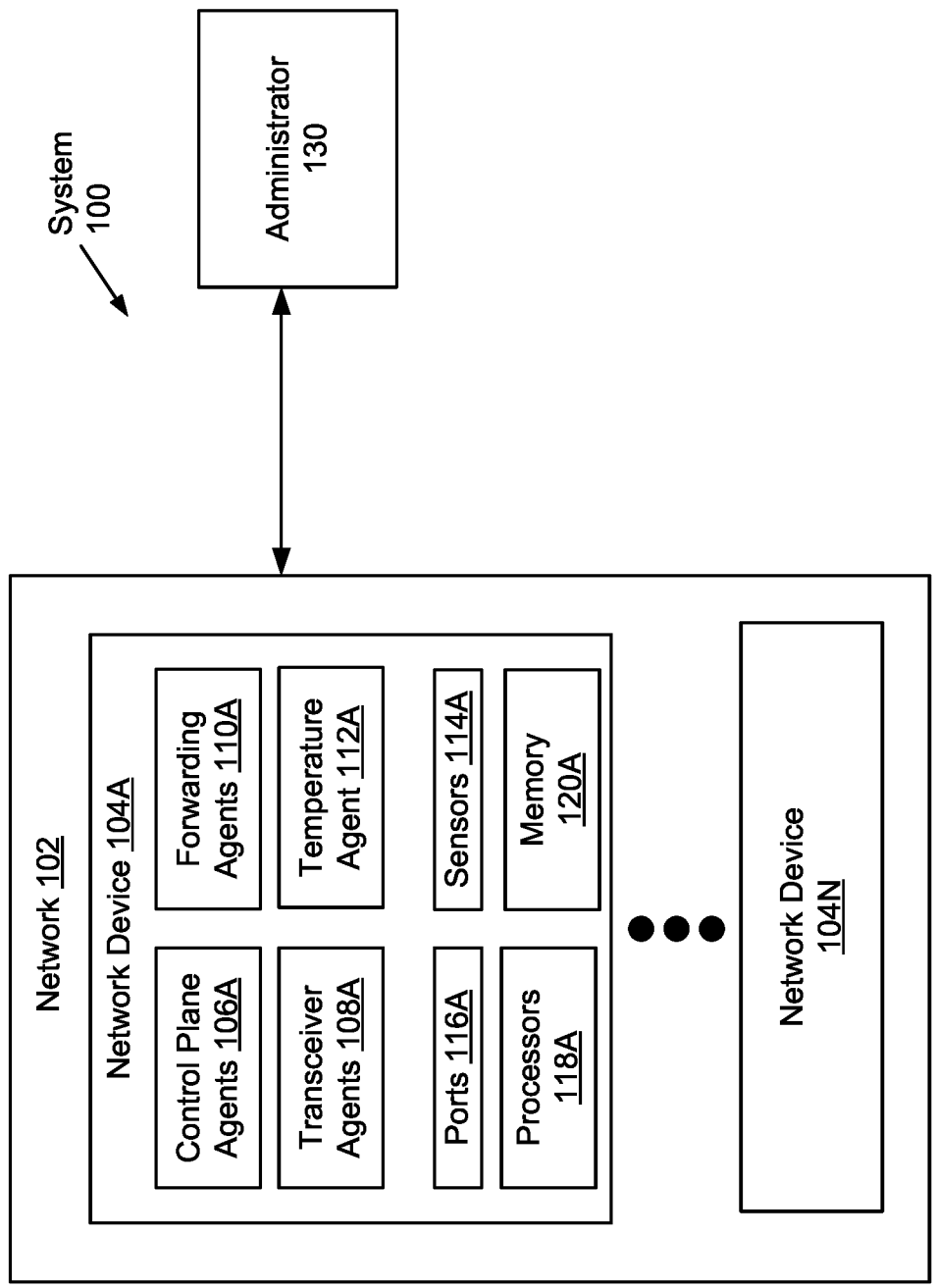
FIG. 1 shows a system in accordance with one or more embodiments disclosed herein.

In general, embodiments disclosed herein provide a method, network device, and computer-readable medium for overheat behavior control. Embodiments monitor the temperature of multiple temperature sensors of a network device and perform overheat mitigation accordingly. In one or more embodiments disclosed herein, in the event that one or more temperature sensors exceed a corresponding threshold, the network device is power cycled. In one or more embodiments disclosed herein, the network device may also include a restricted mode. The restricted mode may restrict one or more capabilities of the network device from restarting when the device powers on. In some embodiments, the restricted mode may be used in combination with the power cycling.

Embodiments provided herein advantageously keep hardware components of a network device from being damaged by high temperatures, while avoiding churn in the network. For example, high temperatures may result in network traffic being diverted away from temperature affected components, which may contribute to churning in the network. Further, embodiments disclosed herein may minimize the amount of effort necessary to bring the network device back into normal operation, i.e., minimize the amount of physical access necessary. Embodiments may further provide methods for minimizing the amount of downtime of a network device by restoring normal operations, e.g., the data plane, quickly.

In accordance with embodiments disclosed herein, temperature monitoring systems for network devices may include hardware and software based mechanisms.

For example, temperature sensors may include a dedicated overheat pin connected to hardware logic of the network device. The dedicated pin is asserted as a result of the detected temperature being greater than a threshold. In accordance with embodiments disclosed herein, such hardware thresholds are set to temperatures where damage is likely to occur. When the pin is asserted, a controller may record a fault in the non-volatile memory indicating the overheat, and power off the network device. In such systems, the standby power must be removed and reapplied in order to re-power the device. Such hardware based temperature systems are considered to be a supplemental failsafe to the software-based mechanisms in accordance with embodiments disclosed herein. Accordingly, software based mechanisms disclosed herein may use thresholds lower than the thresholds for hardware based mechanisms. For example, the threshold temperature for software based mechanisms may be set for up to five degrees lower than the temperature thresholds associated with the hardware-based dedicated pin.

In accordance with one or more embodiments disclosed herein, a software based mechanism of the network device may be used to power cycle the network device in response to a temperature sensor reaching a threshold temperature. As disclosed herein, power cycling refers to a software-based mechanism that powers down and/or resets hardware of the network device and, then, powers up and/or activates hardware of the network device. The powering up is performed without any outside intervention, e.g., without having to physically access the network device. The network device may be powered down for a period of time (which may be statically or dynamically defined) based on power cycling settings in accordance with embodiments disclosed herein.

The power cycling may provide some time for the network device to cool down. More specifically, although power cycling may only give the network device a few seconds to cool before powering back up, for certain devices (e.g., a switch), immediately after powering back up, the load on the CPU may be relatively low and the chips may be in a reset mode. As such, the resultant lower strain on the components may help facilitate the cooling, particularly if an ambient temperature indication of the network device remains at a reasonable level.

In view of the above, one could envision conditions that result in repeated power cycles, which could be detrimental to network operations. Therefore, in accordance with embodiments disclosed herein, a restricted mode is disclosed to address one or more of the aforementioned issues. In the restricted mode, some of the capabilities of the network device are restricted from starting. For example, one or more agents of the network device may be configured to restrict the operation of hardware until certain conditions are met in accordance with embodiments disclosed herein. In some embodiments, one or more agents may not be enabled. The hardware may be restricted by placing the hardware/chips into a reset configuration.

For example, a restricted mode may restrict the operation of hardware until the temperature sensors whose temperature exceeds a threshold are at an acceptable level. In some embodiments, the restricted hardware may not be enabled without intervention from a user or administrator.

The restricted hardware may include hardware that brings up a data plane on the network device in accordance with embodiments disclosed herein. In other words, the restricted mode may prevent a forwarding agent from bringing up the data plane in the network device while the risk of overheating is high. The restricted mode may avoid repeated power cycle loops and network churn in accordance with embodiments disclosed herein.

Embodiments disclosed herein may operate in conjunction with one or more power cycles. For example, embodiments may include entering the restricted mode after one or more power cycles. The restricted mode may be entered based on readings of the temperature sensors, the power cycling data (such as number of cycles, etc.), and/or combinations thereof. Embodiments disclosed herein are not limited as such, for example, the restricted mode may be entered by a user to diagnose/gather data on operation of the network device. As another example, prior to any power cycle, embodiments enable a mode where hardware may be selectively disabled, such as putting all the chips into a reset mode and/or resetting a CPU.

FIG. 1 shows a system in accordance with one or more embodiments disclosed herein. The system (100) includes a plurality of network devices (104A . . . 104N) connected to one another. In this context, the term connected, or connection, means that there exists between elements/components/devices a direct or indirect connection that allows the elements to interact with one another in some way. For example, the term 'connected' may refer to any direct (e.g., wired and/or wireless connection directly between two devices or components) or indirect (e.g., wired and/or wireless connections between any number of devices or components connecting the connected devices) connection that exists between elements/components/devices. For example, the phrase "operably connected" may refer to any direct (e.g., wired directly between two devices or components) or indirect (e.g., wired and/or wireless connections between any number of devices or components connecting the operatively connected devices) connection. Thus, any path through which information may travel may be considered operably connected.

Each network device (104A . . . 104N) may be a physical device that includes non-transitory storage, memory (e.g. Random Access Memory), and one or more processors. The non-transitory storage may include instructions which, when executed by the one or more processors, enable the network device (100) to perform embodiments disclosed herein.

Each network device (104A . . . 104N) includes a number of agents for performing the functions of the network device in accordance with the role the network device serves in the system (100). For example, the network device (104A) includes control plane agents (106A) that include functionality to manage the operation of the control plane capabilities (discussed below), transceiver agents (108A) (which may also be implemented within the control plane of the network device) that include functionality to modify the operation of the transceivers, and forwarding agents (110A) (which may also be implemented within the control plane of the network device) that include functionality to modifying the operation of forwarding hardware in the network device. The network device includes a temperature agent (112A) for managing temperature sensors that are included among the sensors (114A) of the network device (104A). The network device (104A) also includes ports (116A) managed by the agents for network operations. The network device (104A) further includes one or more processors (118A) and memory (120A) to enable the agents. The system (100) may also include an administrator (130) for configuring and managing the system (100).

The network devices (104A . . . 104N) and administrator (130) utilize software instructions in the form of computer readable program code to perform one or more of the embodiments disclosed herein. The instructions may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by one or more processors, is configured to perform one or more embodiments disclosed herein.

Figure 2:
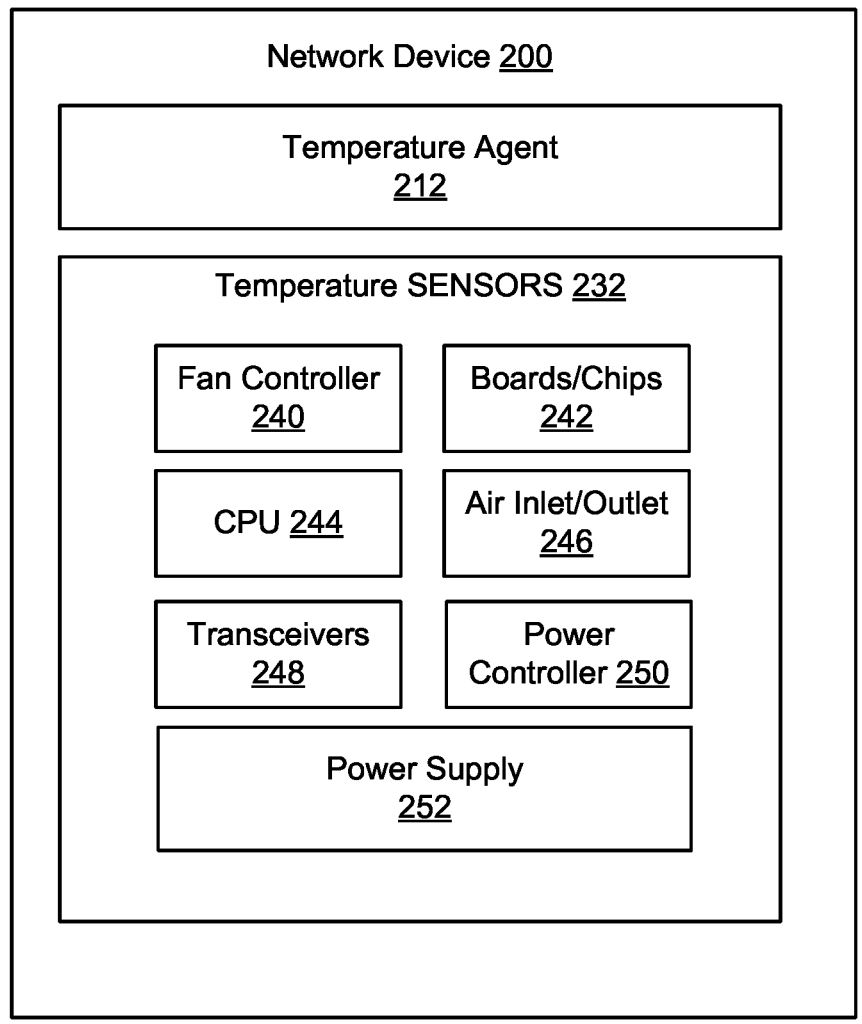
FIG. 2 shows a network device in accordance with one or more embodiments disclosed herein.

FIG. 2 shows a network device in accordance with one or more embodiments disclosed herein. The network device (200) of FIG. 2 includes a temperature agent (212) and a plurality of temperature sensors (232). The temperature sensors (232) may be distributed among different components of the network device (200). In FIG. 2, the network device (200) includes temperature sensors (232) associated with the fan controller (240), boards/chips (242), the central processing unit (CPU) (244), Air inlets/outlets (246), transceivers (248), power controller (250), and power supply (252).

Embodiments disclosed herein are not limited to the temperature sensor categories or components shown in FIG. 2. For example, temperature sensors disposed in a network device may include, but are not limited to, Fan controller (105 C), Inlet air (65-80 C), Forwarding ASIC (105 C), Atomic clock (65 C), Outlet/exhaust air (75-95 C), PHY chip (80-125 C), Board (printed circuit board) (75-110 C), FPGA air (90 C), FPGA die (100-125 C), CPU air (70-85 C), CPU VRM (voltage regulator module) (110-125 C), CPU die (95-115 C), Fabric chip or fabric element (FE) (105-110 C), DRAM (95 C), Management port (75 C), POL (point of load) power converter (125 C), Power supply inlet air (75 C), Power supply hot spot (93-121 C), PCIe switch (103-110 C), and Power over Ethernet (PoE) chips (80 C). The values in parenthesis indicate an example of a threshold temperature (or threshold temperature range) associated with the network device component. In these examples, the threshold temperatures may represent a temperature in which damage may occur.

In some embodiments disclosed herein, the threshold temperatures may be selected to be lower than the temperature at which damage may occur. For example, the threshold temperature for instigating a restricted mode or power cycling may be set for up to five degrees lower than a temperature at which damage can occur.

One of ordinary skills in the art will appreciate that embodiments are not limited to the configurations of FIGS. 1 and 2. Rather, FIGS. 1 and 2 are presented to demonstrate the necessary hardware and a basic software organization to implement embodiments disclosed herein. As presented, embodiments disclosed herein may be performed by the temperature agent (212) of the network device (200). However, embodiments could be performed by other devices in the system, such as an administrator or other network device. In such embodiments, the temperature thresholds may be adjusted to a lower temperature to ensure operation. Embodiments may also include additional devices not shown, such as a central temperature sensor manager for managing the temperature sensors in one or more network devices.

Figure 3:
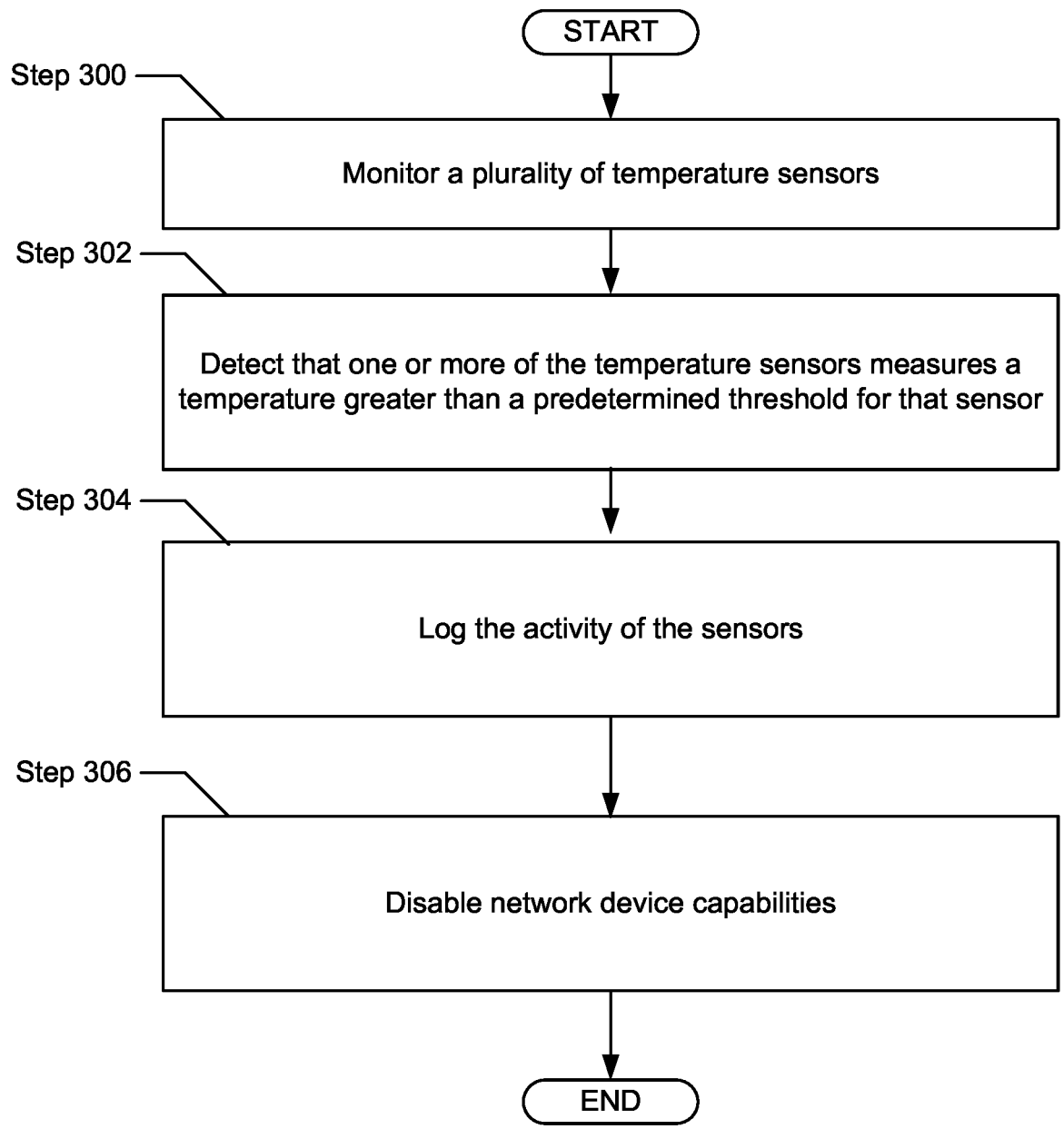
FIG. 3 is a flow chart illustrating an example in accordance with one or more embodiments disclosed herein.

FIG. 3 is a flow chart illustrating an example in accordance with one or more embodiments disclosed herein. Embodiments of FIG. 3 may be performed by a network device or a combination of the network device and other devices in the system. For example, embodiments of FIG. 3 may be performed by the network device, or performed by the network device in combination with an administrator or central temperature sensor manager. In Step 300 of FIG. 3, the temperature sensors of the network device are monitored. Monitoring the temperature sensors of the network device may include periodically probing the temperature sensors for a detected temperature of each sensor.

In Step 302, one or more of the temperature sensors measures a temperature greater than a threshold for that sensor. The identifier, or name, of the specific sensor, measured temperatures, and other information are logged in Step 304. The other information may include measured temperatures of other sensors, such as ambient temperature sensors or sensors located near the specific sensor. The other information may also include an indication of previous power cycles in accordance with embodiments disclosed herein. In one embodiment, an ambient temperature sensor may correspond to a sensor at an air inlet or air outlet of the network device (see e.g. FIG. 2, 246).

In Step 306, one or more of the network device capabilities is disabled. In this step, the network device enters the restricted mode disabling some of the device's capabilities in accordance with embodiments disclosed herein. The network device may also be power cycled prior to disabling some of the network device capabilities.

The embodiments described in FIG. 3 that utilize a power cycle may be repeated a number of times in accordance with embodiments disclosed herein. In some embodiments, the information logged may be used to limit the number of times the network device is power cycled. After the limited number of power cycles, some embodiments may power off the network device. Other embodiments may instigate a restricted mode and disable some of the devices capabilities.

Figure 4:
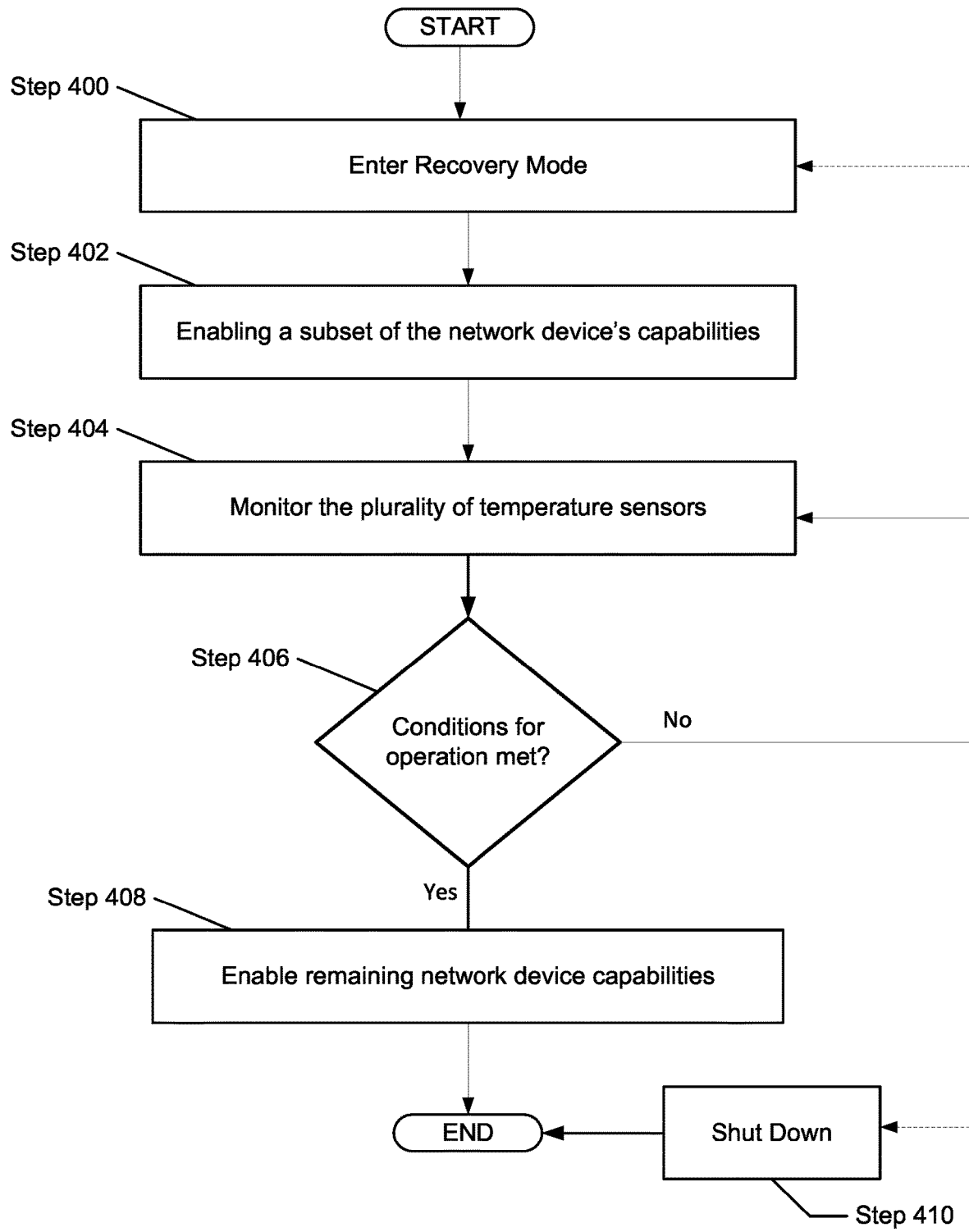
FIG. 4 is a flow chart for a restricted mode in accordance with one or more embodiments disclosed herein.

FIG. 4 is a flow chart for a restricted mode in accordance with one or more embodiments disclosed herein. Similar to FIG. 3, embodiments of FIG. 4 may be performed by a network device or a combination of the network device and other devices in the system. The restricted mode may begin with a power cycle. The power cycle in step 400 may be a power cycle resultant from embodiments described by FIG. 3. In some embodiments, the power cycle may be instigated by a command received from a user or administrator to place the network device into restricted mode. In accordance with embodiments disclosed herein, a power cycle is not necessary to enter the restricted mode. For example, the restricted mode may be entered via a command from the user, or as the result of readings from the temperature sensors.

In embodiments described in FIG. 4, rather than returning the network device to its full operations, only a subset of the network device's capabilities are enabled in Step 402. That is, either only certain agents are enabled in the network device or the agents are enabled but the hardware associated with the agents are maintained in a reset mode, which reduces the load on the network device in uncertain thermal conditions. In embodiments, agents associated with the temperature sensors may be enabled to evaluate the temperature conditions. In one or more embodiments, the control plane agents are enabled to ensure that a management port (and a command line interface (CLI)) are accessible in the network device. In one or more embodiments, the subset of the capabilities may be established by restricting the initialization of some of the network device's capabilities. For example, one or more data and forwarding capabilities may be prevented from initialization, restricting the data capabilities. In some embodiments, such blocking may be triggered by a power cycle due to an overheat.

In Step 404, the plurality of temperature sensors is monitored. At this stage, the network device is powered in a restricted mode.

Based on the measured temperatures in Step 404, it is determined if the conditions for normal operation have been met in Step 406. For example, a condition may include that one or more of the temperature sensors have a temperature that is a certain level (e.g., 10° C.) below their threshold values. Further conditions may include that one or more temperature sensors record a temperature that stays within a certain range (e.g., 10° C.) for an amount of time (e.g., 1-5 minutes). The conditions may also take into account previous behavior of the temperature sensors, such as the number of power cycles performed, the rate of power cycles, the change and rate of the change in temperatures measured by the temperature sensors, etc.

In another embodiment, the condition in Step 406 is based on an ambient temperature of the network device. In one embodiment, the ambient temperature of the network device is the average of two or more measured temperatures by two or more temperature sensors in the network device. In this embodiment, two or more measured temperatures obtained in Step 404 are used to generate an average temperature, which is referred to as an ambient temperature. The ambient temperature may be derived from one or more measured temperatures using other functions without departing from the technology. If an ambient temperature is used in Step 406, then the ambient temperature is compared to an ambient threshold temperature. If the ambient temperature is equal to or less than the ambient threshold temperature, then the condition is satisfied and the process proceeds to step 408.

Continuing with the discussion of FIG. 4, if the conditions for normal operation are met (Yes), the remaining device capabilities are enabled in Step 408. In one or more embodiments, the remaining device capabilities include the data handlers, such as the forwarding plane agents.

If conditions for normal operation are not met (No), the temperature sensors may continue to be monitored until the conditions are met. In some embodiments, the network device may wait for instructions from an operator or administrator. In some embodiments, depending on the conditions of the temperature sensors, a power cycle may be instigated or the network device may be shut down.

Embodiments disclosed herein may minimize the amount of physical access and time necessary to bring a network device back into normal operation in the event of an overheat detection. Because embodiments disclosed herein do not require physical access to the network device, the time and effort to diagnose and alleviate overheat conditions may be drastically reduced. Embodiments may advantageously provide a software based ability to power cycle a network device, and/or place a network device in a restricted mode, in addition to the current hardware based mechanisms.

The advantages discussed throughout the detailed description should be understood as being examples associated with one or more problems being solved by embodiments disclosed herein.

In the above description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of managing overheat behavior in a network device, the method comprising:
   determining, by at least one temperature sensor disposed in the network device, that a temperature of the network device exceeds a threshold;
   based on the determining, logging a temperature sensor identifier of the at least one temperature sensor, the temperature, and one or more actions taken prior to determining that the temperature exceeds the threshold, wherein the one or more actions comprise one or more power cycles;
   disabling network device capabilities; and
   enabling a subset of the network device capabilities after disabling the network device capabilities, wherein the subset of the network device capabilities is enabled based on a number of previous power cycles that occurred in a given period of time prior to determining that the temperature exceeds the threshold.

2. The method of claim 1, wherein the temperature is a first temperature and wherein the threshold is a first threshold, the method further comprising:
   after enabling the subset of network device capabilities, determining that a second temperature associated with the network device is below a second threshold; and
   enabling one or more remaining network device capabilities in response to determining that the second temperature is below the second threshold.

3. The method of claim 2, wherein the one or more remaining network device capabilities comprise data plane capabilities.

4. The method of claim 2, wherein the second temperature is measured by the at least one temperature sensor.

5. The method of claim 1, further comprising:
   after enabling the subset of network device capabilities, enabling one or more remaining network device capabilities in response to a command from a user.

6. The method of claim 1, further comprising:
   power cycling the network device.

7. The method of claim 1, wherein the enabled subset of network device capabilities comprise control plane capabilities.

8. A network device comprising:
   a plurality of temperature sensors; and
   a processor and memory, wherein the processor and memory are configured to:
      operate a plurality of agents including a forwarding agent;
      determine, using one or more given temperature sensors in the plurality of temperature sensors, that a temperature for the network device exceeds a threshold; and
      in response to the determination, perform a power cycle of the network device;
      after a powering up portion of the power cycle, operate the network device in a restricted mode by operating one or more given agents in the plurality of agents while disabling the forwarding agent.

9. The network device of claim 8, wherein the temperature is a first temperature, wherein the threshold is a first threshold, and wherein the processor and memory are further configured to:
   determine that a second temperature detected by the one or more temperature sensors is below a second threshold;
   after disabling the forwarding agent and the forwarding hardware, enable the forwarding agent and the forwarding hardware in response to the determination that the second temperature is below the second threshold.

10. The network device of claim 8, wherein the process and memory are configured to operate the network device in the restricted mode based on one or more previous actions taking prior to the power cycle.

11. The network device of claim 8, wherein the processor and memory are further configured to:
   determine that an ambient temperature of the network device is below an ambient temperature threshold;
   after disabling the forwarding agent and the forwarding hardware, enable the forwarding agent and the forwarding hardware in response to the determination that the ambient temperature is below the ambient temperature threshold.

12. The network device of claim 8, wherein the processor and memory are further configured to:
   after disabling the forwarding agent and the forwarding hardware, enable the forwarding agent and the forwarding hardware in response to a user command.

13. The network device of claim 8, wherein the one or more given agents operated in the restricted mode comprise one or more agents for a management port and a command line interface.

14. The network device of claim 8, further comprising:
   forwarding hardware, wherein the forwarding agent modifies an operation of the forwarding hardware and wherein the forwarding hardware is disabled while operating the one or more given agents in the plurality of agents in the restricted mode.

15. A non-transitory computer readable medium comprising computer readable program code, which when executed by one or more processors, causes the one or more processors to:

determine, with one or more temperature sensors disposed in a network device, that a temperature of the network device exceeds a threshold;

in response to the determination, power cycle the network device by powering down the network device and, after a given period of time, powering up the network device; and upon powering up the network device, enable a subset of network device capabilities while restricting initialization of one or more remaining network device capabilities.

16. The non-transitory computer readable medium of claim 15, wherein the one or more remaining network device capabilities comprise data plane capabilities.

17. The non-transitory computer readable medium of claim 15, further comprising computer readable program code, which when executed by the one or more processors, causes the one or more processors to:

after the subset of network device capabilities is enabled, enable the one or more remaining network device capabilities in response to a user command.

18. The non-transitory computer readable medium of claim 15, wherein the enabled subset of network device capabilities comprise control plane capabilities.

19. The non-transitory computer readable medium of claim 15, wherein the enabled subset of network device capabilities comprise a management port and a command line interface.

20. The non-transitory computer readable medium of claim 15, further comprising computer readable program code, which when executed by the one or more processors, causes the one or more processors to:

after the subset of network device capabilities is enabled, initialize the one or more remaining network device capabilities based on an additional temperature of the network device.

* * * * *